US006211119B1

(12) United States Patent
Herold et al.

(10) Patent No.: US 6,211,119 B1
(45) Date of Patent: Apr. 3, 2001

(54) MULTIPHASE LUBRICANT CONCENTRATES FOR USE IN WATER BASED SYSTEMS IN THE FIELD OF EXPLORATORY SOIL DRILLING

(75) Inventors: Claus-Peter Herold, Mettmann; Heinz Mueller, Monheim; Thomas Foerster; Stephan Von Tapavicza, both of Erkrath; Marcus Claas, Hilden, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/308,399

(22) PCT Filed: Nov. 10, 1997

(86) PCT No.: PCT/EP97/06231

§ 371 Date: Jun. 1, 1999

§ 102(e) Date: Jun. 1, 1999

(87) PCT Pub. No.: WO98/22552

PCT Pub. Date: May 28, 1998

(30) Foreign Application Priority Data

Nov. 18, 1996 (DE) .............................................. 196 47 565

(51) Int. Cl.⁷ .................................................. C09K 7/02

(52) U.S. Cl. ........................ 507/103; 507/127; 507/128; 507/129; 507/131; 507/135; 507/136; 507/138; 507/139; 507/145

(58) Field of Search ................................... 507/135, 136, 507/138, 139, 904, 128, 127, 129, 131, 103, 145

(56) References Cited

U.S. PATENT DOCUMENTS

| | | | |
|---|---|---|---|
| 4,582,138 | * 4/1986 | Balzer | 507/136 |
| 4,705,110 | * 11/1987 | Balzer | 507/136 |
| 5,194,422 | 3/1993 | Mueller et al. | 507/136 |
| 5,232,910 | 8/1993 | Mueller et al. | 507/138 |
| 5,252,554 | 10/1993 | Mueller et al. | 507/138 |
| 5,318,954 | 6/1994 | Mueller et al. | 507/138 |
| 5,348,938 | 9/1994 | Mueller et al. | 507/139 |
| 5,403,822 | 4/1995 | Mueller et al. | 507/138 |
| 5,441,927 | 8/1995 | Mueller et al. | 507/138 |
| 5,618,780 | 4/1997 | Argillier et al. | 508/503 |
| 5,639,715 | * 6/1997 | Patel | 507/135 |
| 5,807,811 | * 9/1998 | Malchow, Jr. | 507/138 |

FOREIGN PATENT DOCUMENTS

| | | |
|---|---|---|
| 1 334 458 | 2/1995 | (CA) . |
| 38 19 193 | 12/1989 | (DE) . |
| 0 117 970 | 9/1984 | (EP) . |
| 0 213 321 | 3/1987 | (EP) . |
| 0 354 586 B1 | 2/1990 | (EP) . |
| 0 374 671 B1 | 6/1990 | (EP) . |
| 0 374 672 B1 | 6/1990 | (EP) . |
| 0 386 636 B1 | 9/1990 | (EP) . |
| 0 386 638 B1 | 9/1990 | (EP) . |
| 0 391 252 | 10/1990 | (EP) . |
| 0 398 112 | 11/1990 | (EP) . |
| 0 521 981 B1 | 1/1993 | (EP) . |
| 0 535 074 B1 | 4/1993 | (EP) . |
| 0 713 909 A1 | 5/1996 | (EP) . |

OTHER PUBLICATIONS

Derwent Patent Abstract (WPAT) No. 87–065778/10, (1987).
Derwent Patent Abstract (WPAT) No. 84–226215/37, (1984).
Derwent Patent Abstract (WPAT) No. 89–364978/50, (1989).
Derwent Patent Abstract (WPAT) No. 90–349915/47, (1990).
Derwent Patent Abstract (WPAT) No. 90–306702/41, (1990).
Derwent Patent Abstract (WPAT) No. 91–296733/41, (1991).
Derwent Patent Abstract (WPAT) No. 96–253038/26, (1996).
Derwent Patent Abstract (WPAT) No. 90–194905/26, (1990).
Derwent Patent Abstract (WPAT) No. 90–19433/26, (1990).
Derwent Patent Abstract (WPAT) No. 90–276696/37, (1990).
Derwent Patent Abstract (WPAT) No. 90–276695/37, (1990).
Derwent Patent Abstract (WPAT) No. 92–024393/03, (1992).
Composition and Properties of Oil Well Drilling Fluids, pp. 50–51, 64–65, 320–325, 526–587 (1980).
Applied Drilling Engineering, pp. 76–81, (1986).

(List continued on next page.)

Primary Examiner—Philip Tucker
(74) Attorney, Agent, or Firm—John E. Drach; Glenn E. J. Murphy; Henry E. Millson, Jr.

(57) ABSTRACT

The invention relates to multiphase lubricant concentrates with improved properties for use in aqueous fluids for geological exploration by drilling which contain organic lubricating components which are solid and/or liquid at room temperature (O phase) together with emulsifiers finely dispersed in a continuous aqueous phase (W phase). These concentrates are characterized in that the system of O phase/W phase and emulsifiers has a phase inversion temperature (PIT) above room temperature and has been produced by heating the multiphase system to temperatures equal to or above the PIT and subsequent cooling to temperatures below the PIT.

The present invention also relates to the use of the multiphase lubricant concentrates as an additive in water-based fluids for use in geological exploration by drilling and for the subsequent treatment of the resulting boreholes.

55 Claims, No Drawings

OTHER PUBLICATIONS

International Journal of Cosmetic Science, vol. 16, (1994) pp. 84–92.

Phase Properties of Emulsions: PIT and HLB, pp. 337–367, (1979).

Surfactants Europa, Third Edition, Chapter 4, pp. 139–317, No Date Available.

Ullmann's Encyclopedia of Industrial Chemistry, vol. A15, pp. 423–511, (1990).

* cited by examiner

MULTIPHASE LUBRICANT CONCENTRATES FOR USE IN WATER BASED SYSTEMS IN THE FIELD OF EXPLORATORY SOIL DRILLING

BACKGROUND OF THE INVENTION

1. Field of the Invention

This invention relates to a new form of presentation improved in many respects for lubricants and lubricant systems which are added in geological exploration to corresponding water-based drilling fluids and/or other water-based working fluids from this field. In the following, the invention is described with reference to pure water-based drilling fluids and drilling muds based thereon. However, the fluids according to the invention are by no means confined to this particular application. On the contrary, the invention also encompasses corresponding fluids for tackling problems arising out of differential sticking, more particularly spotting fluids and fluids used for workover, stimulation and comparable applications in geological drilling.

2. Discussion of Related Art

In the relevant technology of the geological exploration of, for example, oil and/or gas occurrences, there are three basic types of auxiliary fluids used in practice, more particularly corresponding drilling muds: oil-based systems which generally comprise a continuous oil phase mixed with a disperse water phase in the form of so-called w/o invert muds, water-based oil/water systems in which the aqueous phase with its dissolved and dispersed auxiliaries forms the continuous phase and the oil phase is dispersed therein in the form of a fine emulsion and, finally, pure water-based drilling fluids. So far as the pure water-based drilling fluids in particular are concerned, proposals have recently been taken up again to use purely aqueous systems based on soluble alkali metal silicates which are also known as waterglasses or waterglass-based systems.

The use of components with a pronounced lubricating effect in drilling muds can be extremely important. Thus, the rate of advance can be significantly accelerated so that the time required to drill to predetermined depths can be shortened and problems, for example arising out of differential sticking, are prevented or at least suppressed. General expert knowledge is relevant in this regard, cf. for example the book by George R. Gray and H. C. H. Darley entitled "Composition and Properties of Oil Well Drilling Fluids", 4th Edition, 1980/81, Gulf Publishing Company, Houston and the extensive scientific and patent literature cited therein and the manual entitled "Applied Drilling Engineering" by Adam T. Borgoyne, Jr. et al., First Printing Society of Petroleum Engineers, Richardson, Tex. (USA).

The use of auxiliary components with a lubricating effect can be of particular importance for water-based working fluids, more particularly corresponding water-based drilling muds. The following specific problem inter alia arises in this regard: auxiliary components with a pronounced lubricating effect which are insoluble in the aqueous system—normally corresponding components of organic origin—should consist of very fine particles and should be uniformly dispersed in the drilling fluid. This applies in particular to their primary incorporation in the drilling mud for periodically or continuously increasing the amount of drilling mud which is increasingly demanded by the rate of advance and by the increasing size of the borehole to be filled with the drilling mud.

The problem addressed by the present invention is in particular to provide a new form of presentation in which organic lubricants or lubricant systems are stably and very finely dispersed in a continuous aqueous phase. The incorporation of such lubricant systems in water-based auxiliary fluids, for example of the drilling mud type, and the immediate very fine homogenization of the organic phase in the water-based system are thus made possible. At the same time, the effect of the organic based lubricants is enhanced, at least in the early stages of their use.

SUMMARY OF THE INVENTION

In a first embodiment, therefore, the present invention relates to multiphase lubricant concentrates with improved properties for use in water-based drilling fluids containing organic components with a lubricating effect which are liquid and/or solid at room temperature (O phase) in conjunction with emulsifiers finely dispersed in a continuous aqueous phase (W phase), these multiphase lubricant concentrates being characterized in that the system of O phase/W phase and emulsifiers has a phase inversion temperature (PIT) above room temperature and has been produced by heating the multiphase system to temperatures equal to or above the PIT and subsequent cooling to temperatures below the PIT. The lower limit to the PIT of the multiphase system is at temperatures of at least 25 to 30° C. and preferably higher, for example at temperatures of or above 40 to 50° C.

In another embodiment, the present invention relates to the use of the multiphase lubricant concentrates as an additive for water-based drilling fluids and borehole servicing fluids. In one important embodiment, the multiphase lubricant concentrates are added to pure water-based drilling fluids and/or emulsion drilling fluids of the o/w type. However, the multiphase lubricant concentrates may also be added to working fluids of which the working temperature in situ within the rock is above the PIT of the multiphase system.

DESCRIPTION OF THE INVENTION

To enable the working principles of the invention as discussed in the following to be understood, the relevant specialist knowledge is briefly reported in the following:

It is well known that, where selected, more particularly at least partly nonionic emulsifiers or emulsifier systems are used, oil-in-water emulsions undergo phase inversion on heating, i.e. the outer aqueous phase can become the inner phase at relatively high temperatures. Extensive prior art literature is concerned with this natural scientific phenomenon of phase inversion, with the characteristics and the adaptation of selected emulsifiers for developing this capacity for phase inversion and with potential practical applications for utilizing this special effect. Hitherto, this technology has been of particular significance in connection with the production of cosmetic formulations, cf. for example the disclosures of EP 0 354 586 and EP 0 521 981 which describe the production of stable low-viscosity oil-in-water emulsions of polar oil components and the production of oil-in-water creams.

Applicants' earlier application U.S. Ser. No. 08/933,188, now U.S. Pat. No. 6,022,833, incorporated herein by reference relates to the application of this natural scientific principle of phase inversion in multiphase mixtures of water and oil to water-based drilling fluids and/or borehole servicing fluids. The disclosure of this earlier application goes in detail into the natural scientific and technical parameters and their acknowledgement in the application of the known principle of phase inversion or rather the phase inversion temperature (PIT) range. The disclosure of this earlier application is hereby specifically included as part of the disclosure of the present invention so that only a brief summary of important aspects of established expert knowledge to be taken into account in the teaching of the present invention is given in the following.

The establishment of the particular phase inversion temperature range (PIT or middle phase) during the temperature-dependent formation of the particular stable system in the o/w-middle phase-w/o phase equilibrium is influenced by a number of specific parameters: chemical nature of the oil phase; character of the emulsifiers/emulsifier systems; loading of the aqueous phase. The phase inversion temperature range of the particular multicomponent system can be experimentally determined by measuring the electrical conductivity as a function of the temperature of the multicomponent system. The continuous aqueous phase in the o/w system ensures high electrical conductivity. The continuous oil phase in the w/o system allows the electrical conductivity to fall to substantially zero. The temperature range between these two limits is characteristic of the middle inversion phase.

In addition, the more recent literature shows how the phase inversion temperature range can be calculated, cf. in particular the article by TH. FÖRSTER, W. VON RYBINSKI, H. TESMANN and A. WADLE entitled "Calculation of Optimum Emulsifier Mixtures for Phase Inversion Emulsification" in International Journal of Cosmetic Science 16, 84–92 (1994). This article contains an account of how the phase inversion temperature (PIT) range of predetermined three-component systems of an oil phase, a water phase and an emulsifier can be calculated by the CAPICO method (calculation of phase inversion in concentrates) on the basis of the EACN value (equivalent alkane carbon number) characteristic of the oil phase. More particularly, this article by FÖRSTER et al. cites important literature for the subject under discussion here, cf. the list of literature references on pages 91 and 92 which should be read in conjunction with the disclosure of this article by FÖRSTER et al. With the aid of numerous examples, it is shown how emulsifiers/emulsifier systems can be selected and optimized by the CAPICO method in conjunction with the EACN concept for establishing predetermined values for the phase inversion temperature range.

In addition, the cited literature makes the following important facts clear:

Heating of the multiphase mixtures to temperatures in the phase inversion temperature (PIT) range and/or higher and subsequent cooling of the heated mixture to temperatures below the PIT leads to water-based o/w emulsions or dispersions with an extremely fine-particle O phase. The particle fineness of the emulsions can be so great that their particles are no longer optically visible. Instead, the emulsions have a transparent, opalescent appearance. This state can be preserved over relatively long periods of storage by adequately lowering the temperature of the mixture below the phase inversion temperature range. The teaching according to the invention makes use of this in preferred embodiments.

Accordingly, preferred lubricant concentrates according to the invention are distinguished by the fact that the lower limit to the PIT of the multiphase system is at temperatures above 25 to 30° C. and preferably at temperatures of 40 to 50° C. or higher. It can be particularly advisable to use such emulsifiers/emulsifier systems in the particular system in order once again to establish relatively high lower limits for the PIT of the multiphase system, i.e. for example lower limits of 60 to 70° C. or even higher. It is clear that, for storing the multicomponent system prepared in accordance with the invention with an extremely fine-particle, disperse oil phase either at room temperature or only slightly elevated temperatures, an adequate distance from the lower limit of the PIT can be important for guaranteeing permanent very fine dispersion of the oil phase. Temperature ranges of at least 20 to 40° C. between the storage temperature and the lower limit of the PIT can provide the required stability.

The aspect under discussion here becomes less important when the disperse oil phase has solidified during storage to form a solid, so that recombination at the storage temperature is ruled out from the outset, cf. the relevant particulars given in the following.

In another preferred embodiment of the invention, the upper limit to the phase inversion temperature of the multiphase system is at most about 100° C. or only slightly higher, i.e. at most 110 to 120° C. The upper PIT limit is preferably in the range from 80 to 95° C. and, more particularly, is up to at most 90° C. This ensures that no additional technical difficulties arise during development of the microemulsion phase through establishment of the PIT range.

The components used in accordance with the invention as lubricants or lubricant components may be liquid and/or solid at room temperature. In practical application, for example in the water-based drilling mud, they are of course introduced into the interior of the rock with its high working temperatures and melt or soften therein in known manner to such an extent that they are able to perform their function as lubricants even when they are solid at room temperature. Basically, however, it is the following advantage which is crucial to the teaching according to the invention: the incorporation of fresh multiphase lubricant concentrates prepared in accordance with the invention in drilling fluids, more particularly in water-based drilling muds, leads to the uniform, problem-free distribution of the lubricant component in the form of very fine particles in the overall volume of the working fluid.

If organic lubricant components present as solids at room temperature or at only slightly elevated storage temperatures are to be used in accordance with the invention, it may be preferable to select components which are at least predominantly liquid at or above the phase inversion temperature and, in particular at the maximum working temperatures for subsequently initiating phase inversion by cooling. Accordingly, lubricant components with melting points of at most about 100° C., but preferably lower, are generally preferred.

The weight ratios of W phase to O phase for the lubricant concentrates according to the invention may vary within wide limits. The broad range of (W phase/O phase) of 10:90 to 90:10 is basically suitable, a corresponding ratio in the range from 25:75 to 80:20 being preferred. Particularly suitable ratios are in the range from 35:65 to 60:40, both low-viscosity and comparatively high-viscosity, i.e. thick, emulsions or dispersions being suitable as long as the o/w state is guaranteed. Adequate fluidity of the lubricant concentrate can always be established in situ by simple dilution with water or aqueous components.

Relevant specialist knowledge on the significance of emulsifiers to the phenomenon of temperature-dependent phase inversion (PIT) and expert knowledge on emulsifiers in general may be used for the task of selecting suitable emulsifiers/emulsifier systems. As previously mentioned, particularly suitable emulsifiers/emulsifier systems are those which are at least partly and preferably at least predominantly nonionic and/or which combine both nonionic structural elements and anionic structural elements with one another in the basic molecular structure. Basically, multi-component emulsifier systems are preferably used above all to enable the PIT to be more easily adapted to the predetermined phase inversion temperature range. Mixtures of far more hydrophilic than lipophilic emulsifiers with more lipophilic than hydrophilic co-emulsifiers can be particularly important in this regard. Emulsifiers with HLB values in the range from 6 to 20 and preferably in the range from 7 to 18 are preferred auxiliaries of the type in question. In another preferred embodiment, emulsifiers such as these are used together with more lipophilic than hydrophilic co-emulsifiers which have a lower HLB value than the particular emulsifier component(s).

Extensive textbook knowledge and other relevant material is available on the chemical characteristics of nonionic emulsifiers or emulsifier systems containing nonionic components, cf. in this connection K. SHINODA and H. KUNIEDA "Phase Properties of Emulsions: PIT and HLB" in "Encyclopedia of Emulsion Technology" 1983, Vol. 1, 337 to 367. The relevant prior art literature is also represented by the Article by Gordon L. Hollis in Surfactants Europa, Third Edition, The Royal Society of Chemistry, more particularly Chapter 4, Nonionics (pages 139 to 317) and, for example, by the following publications which have appeared in book form: M. J. Schick "NONIONIC SURFACTANTS", Marcel Dekker, INC., New York, 1967; H. W. Stache "ANIONIC SURFACTANTS", Marcel Dekker, INC., New York, Basel, Hong Kong; Dr. N. Schönfeldt "Grenzflächenaktive Ethylenoxid-Addukte", Wissenschaftliche Verlagsgesellschaft mbH, Stuttgart 1976.

From this extensive knowledge of at least partly nonionic emulsifiers or emulsifier systems, it is possible using the specialist knowledge previously cited (SHINODA et al. and Th. Förster et al.) to calculate the phase inversion temperature range for given mixtures of oil phase, emulsifier and aqueous phase. Accordingly, a few additional determining elements preferably applied in accordance with the invention to the choice of the emulsifiers/emulsifier systems are discussed in the following. Particularly suitable emulsifiers and/or co-emulsifiers may be assigned in particular to at least one of the following classes:

(Oligo)alkoxylates—more particularly lower alkoxylates, above all corresponding ethoxylates and/or propoxylates—of basic molecules of natural and/or synthetic origin which contain lipophilic residues and which are capable of alkoxylation. The length of the alkoxylate groups in relation to the lipophilic residues present in the molecule determines the ratio of hydrophilic to hydrophobic behavior in known manner and the associated assignment of the HLB values. It is known that alkoxylates of the type mentioned are nonionic emulsifiers as such, i.e. with a free terminal hydroxyl group at the alkoxylate unit, although the corresponding compounds may also be end-capped, for example by esterification and/or etherification.

Another important class of nonionic emulsifiers for the purposes of the invention are partial esters and/or partial ethers of polyhydric alcohols containing in particular 2 to 6 carbon atoms and 2 to 6 OH groups and/or oligomers thereof with acids and/or alcohols containing lipophilic groups. Accordingly, the polyhydric alcohols containing 2 to 6 OH groups in the basic molecule or the oligomers derived therefrom may be, in particular, diols and/or triols or oligo-merization products thereof, particular significance being attributed to glycol and glycerol or their oligomers. However, other polyhydric alcohols of the type generically mentioned here, such as trimethylol propane, pentaerythritol up to glycosides—or their respective oligomers—may also be basic molecules for the reaction with acids and/or alcohols containing lipophilic groups which are thus important emulsifiers for the purposes of the invention. Known nonionic emulsifiers of the ethylene oxide/propylene oxide/butylene oxide block polymer type may also be assigned to the class of partial ethers cf polyhydric alcohols. Another example of corresponding emulsifier components are alkyl (poly)glycosides of long-chain alcohols.

One particularly important example of co-emulsifiers are fatty alcohols of natural and/or synthetic origin; other examples are alkylolamides, amine oxides and lecithins.

Without any claim to completeness, the following representatives of the classes of compounds listed above are mentioned in the following. The (oligo)alkoxylates of basic molecules containing lipophilic groups may be derived in particular from selected representatives of the following classes of basic molecules containing lipophilic groups: fatty alcohols, fatty acids, fatty amines, fatty amides, fatty acid and/or fatty alcohol esters and/or ethers, alkanolamides, alkylphenols and/or reaction products thereof with formalde-hyde and other reaction products of carrier molecules containing lipophilic groups with lower alkoxides. As mentioned above, the reaction products may also be at least partly and-capped. Examples of partial esters and/or partial ethers of polyhydric alcohols are, in particular, the corresponding partial esters with fatty acids, for example of the glycerol monoester and/or diester type, glycol monoesters, corresponding partial esters of oligomerized polyhydric alcohols, sorbitan partial esters and the like. The extensive specialist knowledge available on the subject may be applied in this regard. Partial esters and/or ethers of the type in question may also be in particular basic molecules for an (oligo)alkoxylation reaction.

In order to determine the particular temperature range for phase inversion in the lubricant concentrates according to the invention, it can be important inter alia to adapt the quantity of emulsifiers/emulsifier systems used in the multicomponent mixture to the percentage content of lubricating oil phase present therein. Preferred quantities of emulsifiers are of the order of 1% by weight or more and preferably in the range from 5 to 60% by weight, based on the lubricating oil phase. In terms of practical application, the following quantity ranges have proved to be particularly suitable for the emulsifiers/emulsifier systems used in accordance with the invention (again based on the oil phase): 10 to 50% by weight, preferably 15 to 40% by weight and more preferably 20 to 35% by weight.

Suitable lubricant components of organic origin may be selected from the broad range of organic lubricating compounds which may comprise both pure hydrocarbons and also corresponding hydrocarbon compounds containing functional groups which, for example, initiate surface adhesion or other known effects that are known for lubrication purposes, more particularly under the high-pressure conditions which can also occur in the field of application targeted by the present invention.

Basically, suitable lubricants are on the one hand O phases which, preferably for at least the predominant part, may be assigned to the following classes of compounds or mixtures thereof: saturated hydrocarbons (linear, branched and/or cyclic), olefinically unsaturated hydrocarbons (linear, branched and/or cyclic), fatty alcohols (linear and/or branched and saturated and/or olefinically unsaturated), carboxylic acid esters, for example triglycerides, carbonic acid esters, polyesters, acetals, ketones, (poly)ethers, silicone oils or other functionalized hydrocarbon compounds, such as (oligo)amides, (oligo)imides and/or (oligo)ketones.

Polyester oils are organic components which are distinguished by a pronounced lubricating effect. The more recent prior art literature is represented, for example, by EP 0 713 909. Other literature references on suitable ester oils include European patents EP 0 374 671, EP 0 374 672, EP 0 386 638, EP 0 386 636 and EP 0 535 074.

In addition, general expert knowledge of lubricants and related products is relevant in this regard, cf. for example "Ullmann's Encyclopedia of Industrial Chemistry", 5th Edition, Volume A15, and the abstract entitled "Lubricants and Related Products" on pages 423 to 511, Dieter Klamann, Hamburg, and the literature additionally cited in this regard. This account of the mixtures in question describes organic lubricating components which are flowable at room temperature and those which are solid at room temperature which may also be of significance in the context of the present invention.

Besides the principal components of these lubricants forming the O phase, the invention encompasses the use of additives for developing special lubricating effects as known in principle in the relevant prior art.

Thus, according to the invention, it may be advisable to secure and/or improve the lubricating effect of the added component even under working conditions involving extreme pressure. There are various known additives for such working conditions, so-called extreme-pressure additives, which effectively secure improved lubrication in such conditions.

The prior-art literature in this regard is represented by "Ullmann's Encyclopedia of Industrial Chemistry", 5th Edition, Volume A15, Chapter "Lubricants and Related Products" and the associated Sub-chapter 7.5 "Extreme-Pressure Additives" (loc. cit., pages 450/1). An additional disclosure in this connection can be found in Sub-chapter 4.4 "Phosphoric Acid Esters", loc. cit., pages 440/1.

These literature references describe many representatives of extreme-pressure lubricants from a plurality of classes of at least predominantly organic compounds. The following representatives in particular are named: P-containing organic compounds, for example aromatic and/or aliphatic esters—including corresponding partial esters—of acids of phosphorus and/or partial salts thereof, for example corresponding phosphates and/or phosphonates; sulfurized organic compounds in which polysulfidic bridge elements in particular yield sulfur accessible under in-use conditions for covering/reacting off with metal surfaces, for example sulfurized hydrocarbon compounds, sulfurized ester oils, corresponding fatty alcohols, fatty acids and the like; organic nitrogen compounds, such as aromatic nitro compounds, aminophenol derivatives, esters of carbamic acids, salts of organic bases with organic acids and, finally, organohalogen compounds.

Multicomponent additives in which two or more of the classes of compounds mentioned are mixed or combined in the molecular structure are particularly effective. Combinations of sulfur-, phosphorus- and/or nitrogen-containing additives are particularly suitable.

Where additives of the type in question, particularly extreme-pressure additives, are used, they are normally added to the lubricating additives or mixtures according to the invention in small quantities.

Applicants' parallel patent application Ser. No. 09/308, 400 pending, the U.S. National phase PCT filing of PCT/EP97/06231, incorporated herein by reference ("Use of Selected Fatty Alcohols and Mixtures Thereof with Carboxylic Acid Esters as Lubricant Component in Water-based Drilling Fluids for Geological Exploration") describes the use of linear and/or branched fatty alcohols containing at least 12 carbon atoms in the molecule and mixtures thereof with carboxylic acid esters as a lubricating additive in water-based drilling fluids for their use in geological exploration by drilling. Particularly preferred fatty alcohols are those in the $C_{12-30}$ range and, more particularly, those in the $C_{12-24}$ range. Particular emphasis is placed in this regard on monoolefinically and/or polyolefinically unsaturated $C_{16-24}$ fatty alcohols and/or $C_{12-20}$ Guerbet alcohols. Preferred esters for use in conjunction with alcohols of this type are corresponding esters of monobasic and/or polybasic carboxylic acids with monohydric and/or polyhydric alcohols, corresponding esters of linear, optionally olefinically unsaturated monocarboxylic acids of the fatty range (above all $C_{12-24}$) being particularly preferred. Lubricants in the context of the disclosure of this parallel application are particularly suitable materials for use in implementing the teaching according to the present invention. In addition, distillation residues from the production of corresponding fatty alcohols have proved to be an extremely effective class of lubricants for water-based drilling fluids. These distillation residues may be solid and/or liquid at room temperature. The teaching according to the invention opens up access to a form of presentation which has not hitherto been available in practice.

Both here and in the selected formulations according to the invention, the new forms of presentation of the lubricant concentrates with the required capacity for direct homogenization in water-based systems can be obtained by mixing with emuisifiers/emulsifier systems selected in accordance with the invention and aqueous phase, heating to temperatures equal to or above the phase inversion temperature (PIT) and cooling to temperatures below the PIT, if desired with stirring, for example, to introduce energy.

EXAMPLES

The following Examples describe lubricant concentrates according to the invention.

The following components are used in equal mixing ratios as lubricant components:

OMC 586

Oil phase based on an ester mixture of substantially saturated fatty acids based on palm kernel oil and 2-ethylhexanol which goes back predominantly to $C_{12-14}$ fatty acids.

HD-Ocenol 80/85

Olefinically unsaturated fatty alcohol of natural origin predominantly in the $C_{16/18}$ range; hydroxyl value 205 to 215, iodine value 84 to 89, solidification range 6 to 14° C.

A mixture of emulsifier (Eumulgin HRE 40) and co-emulsifier (Monomuls 90-L-12) is used as the emulsifier system (Eumulgin HRE 40 is a hydrogenated castor oil containing 40 EO; Monomuls 90-L-12 is glycerol monolaurate).

In every case, water deionized by ion exchange is used as the aqueous phase. The water-based PIT lubricant emulsions according to the invention are prepared by heating the particular water-containing multicomponent mixture with stirring to a maximum temperature of 98.5° C. and subsequent cooling with stirring to temperatures around room temperature.

The middle phase (PIT range with lower and upper limits) is determined by measuring the electrical conductivity during heating—PIT (upwards)—and during cooling—PIT (downwards). Particulars of this known method of measurement can be found, for example, in EP 0 345 586 and in EP 0 521 981.

The mixing ratios of the multicomponent mixtures used in Examples 1 to 3 are shown first in the following Table. They are followed by the temperature limits determined for the middle phase (lower limit and associated upper limit in ° C.). In the cases presented here, the respective PIT ranges largely correspond in the "upwards" and "downwards" directions.

Finally, the consistency and appearance of the test emulsions cooled to room temperature is assigned to each Example as a final observation. All the emulsions are water-based emulsions which are blue in color and have an extremely finely divided oil phase.

| PIT - Lubricant Emulsion (in % by weight AS) | | | |
| --- | --- | --- | --- |
| Examples | 1 | 2 | 3 |
| OMC 586 | 22.5 | 25.0 | 25.0 |
| HD-Ocenol 80/85 | 22.5 | 25.0 | 25.0 |
| Eumulgin HRE 40 | 6.5 | 6.5 | 7.75 |
| Monomuls 90-L-12 | 3.5 | 3.5 | 4.42 |
| Water | 45.0 | 40.0 | 38.0 |
| PIT/° C. (upwards) | 75–89 | 88–94 | 67–85 |
| PIT/° C. (downwards) | 80–89 | 88–94 | 71–85 |
| Appearance | Low-viscosity, blue | Low-viscosity, blue | Flowable, blue |

What is claimed is:

1. A method of geological exploration by drilling or treatment of boreholes resulting therefrom, comprising:
   a) forming a multiphase lubricant concentrate comprising a dispersed oil phase containing an organic lubricant, an emulsifier, and a continuous water phase, said concentrate having a phase inversion temperature above room temperature;
   b) heating the concentrate to a temperature greater than or equal to the phase inversion temperature;
   c) cooling the concentrate to a temperature below the phase inversion temperature, whereby the oil phase is finely dispersed in the water phase; and
   d) adding the lubricant concentrate to a water-based drilling fluid or an oil-in-water emulsion drilling fluid.

2. The process of claim 1 wherein the drilling fluid further comprises an extreme pressure additive.

3. The process of claim 1 wherein the multiphase lubricant concentrate has a lower limit of the phase inversion temperature above 25° C.

4. The process of claim 3 wherein the multiphase lubricant concentrate has a lower limit of the phase inversion temperature above 30° C.

5. The process of claim 4 wherein the multiphase lubricant concentrate has a lower limit of the phase inversion temperature above 40° C.

6. The process of claim 5 wherein the multiphase lubricant concentrate has a lower limit of the phase inversion temperature above 50° C.

7. The process of claim 6 wherein the multiphase lubricant concentrate has a lower limit of the phase inversion temperature of greater than 60° C.

8. The process of claim 1 wherein the multiphase lubricant concentrate has an upper limit of the phase inversion temperature of 120° C.

9. The process of claim 8 wherein the multiphase lubricant concentrate has an upper limit of the phase inversion temperature of 100° C.

10. The process of claim 9 wherein the multiphase lubricant concentrate has an upper limit of the phase inversion temperature of 90° C.

11. The process of claim 10 wherein the multiphase lubricant concentrate has an upper limit of the phase inversion temperature of 80° C.

12. The process of claim 1 wherein the multiphase lubricant concentrate has a phase inversion temperature of 25° C. to 120° C.

13. The process of claim 12 wherein the multiphase lubricant concentrate has a phase inversion temperature of 25° C. to 100° C.

14. The process of claim 13 wherein the multiphase lubricant concentrate has a phase inversion temperature of 40° C. to 90° C.

15. The process of claim 14 wherein the multiphase lubricant concentrate has a phase inversion temperature of 50° C. to 80° C.

16. The process of claim 15 wherein the multiphase lubricant concentrate has a phase inversion temperature of 60° C. to 80° C.

17. The process of claim 1 wherein the organic lubricant is present in liquid form at a temperature equal to or greater than the phase inversion temperature.

18. The process of claim 1 wherein the weight ratio of the oil phase to the water phase is 10:90 to 90:10.

19. The process of claim 18 wherein the weight ratio of the oil phase to the water phase is 25:75 to 80:20.

20. The process of claim 19 wherein the weight ratio of the oil phase to the water phase is 35:65 to 60:40.

21. The process of claim 1 wherein the emulsifier comprises a nonionic emulsifier or an emulsifier having nonionic and anionic structural elements.

22. The process of claim 1 wherein the emulsifier comprises a hydrophilic emulsifier and a lipophilic co-emulsifier.

23. The process of claim 22 wherein the hydrophilic emulsifier has an HLB value of 6 to 20 and the lipophilic co-emulsifier has an HLB value lower than that of the hydrophilic emulsifier.

24. The process of claim 23 wherein the hydrophilic emulsifier has a HLB value of 7 to 18.

25. The process of claim 1 wherein the emulsifier is selected from the group consisting of alkoxylates, oligoalkoxylates partial esters, partial esters of polyhydric alcohols, and fatty alcohols.

26. The process of claim 1 wherein the emulsifier is present at greater than 1 percent by weight based on the oil phase.

27. The process of claim 26 wherein the emulsifier is present at 5 to 60 percent by weight based on the oil phase.

28. The process of claim 27 wherein the emulsifier is present at 10 to 50 percent by weight based on the oil phase.

29. The process of claim 28 wherein the emulsifier is present at 15 to 40 percent by weight based on the oil phase.

30. The process of claim 29 wherein the emulsifier is present at 20 to 35 percent by weight based on the oil phase.

31. The process of claim 1 wherein the oil phase comprises a compound selected from the group consisting of saturated hydrocarbons, olefinically unsaturated hydrocarbons, fatty alcohols, carboxylic acid esters, carbonic acid esters, polyesters, acetals, ketones, ethers, polyethers, silicone oils, amides, oligoamides, Imides, oligoimides, ketones and oligoketones.

32. The process of claim 1 wherein the oil phase comprise a linear or branched fatty alcohol having at least 12 carbon atoms or a mixture thereof with a carboxylic acid ester.

33. The process of claim 32 wherein the oil phase comprises $C_{12-30}$ fatty alcohol.

34. The process of claim 1 wherein the water-based drilling fluid or oil-in-water emulsion drilling fluid has a working temperature greater than the phase inversion temperature of the lubricant concentrate.

35. The process of claim 1 wherein the water-based drilling fluid comprises soluble alkali metal silicate.

36. The process of claim 35 wherein the oil phase comprises a fatty alcohol, or a mixture of a fatty alcohol with a carboxylic acid ester or a carbonic acid ester.

37. A water-based drilling fluid comprising:

(a) a multiphase lubricant concentrate comprising a finely dispersed oil phase containing an organic lubricant, an emulsifier, and a water phase; and (b) an extreme pressure additive;

wherein the phase inversion temperature of said multiphase lubricant concentrate is greater than room temperature and has an upper limit of 120° C.

38. The water-based drilling fluid of claim 37 wherein the multiphase lubricant concentrate has an upper limit of the phase inversion temperature of 100° C.

39. The water-based drilling fluid of claim 38 wherein the multiphase lubricant concentrate has an upper limit of the phase inversion temperature of 90° C.

40. The water-based drilling fluid of claim 39 wherein the multiphase lubricant concentrate has an upper limit of the phase inversion temperature of 80° C.

41. The water-based drilling fluid of claim 37 wherein the multiphase lubricant concentrated has a phase inversion temperture of 25° C. to 125° C.

42. The water-based drilling fluid of claim 41 wherein the multiphase lubricant concentrate has a phase inversion temperature of 25° C. to 100° C.

43. The water-based drilling fluid of claim 42 wherein the multiphase lubricant concentrate has a phase inversion temperature of 40° C. to 90° C.

44. The water-based drilling fluid of claim 43 wherein the multiphase lubricant concentrate has a phase inversion temperature of 50° C. to 80° C.

45. The water-based drilling fluid of claim 44 wherein the multiphase lubricant concentrate has a phase inversion temperature of 60° C. to 80° C.

46. The water-based drilling fluid of claim 45 wherein the organic lubricant is present in liquid form at a temperature equal to or greater than the phase inversion temperature.

47. The water-based dreilling fluid of claim 37 wherein the emulsifier is comprised a hydrophilic emulsifier and a lipophilic co-emulsifier.

48. The water-based drilling fluid of claim 47 wherein the hydrophilic emulsifier has an HLB value of 6 to 20 and the lipophilic co-emulsifier has an HLB value lower than that of the hydrophilic emulsifier.

49. The water-based drilling fluid of claim 48 wherein the hydrophilic emulsifier has a HLB value of 7 to 18.

50. The water-based drilling fluid of claim 37 wherein the emulsifier is selected from the group consisting of alkoxylates, oligoalkoxylates partial esters, partial esters of polyhydric alcohols, and fatty alcohols.

51. The water-based drilling fluid of claim 37 wherein the oil phase comprises a linear or branched fatty alcohol having at least 12 carbon atoms or a mixture thereof with a carboxylic acid ester.

52. The water-based drilling fluid of claim 51 wherein the oil phase comprises $C_{12-30}$ fatty alcohol.

53. The water-based drilling fluid of claim 37 wherein the water-based drilling fluid has a working temperature greater than the phase inversion temperature of the lubricant concentrate.

54. The water-based drilling fluid of claim 37 wherein the water-based drilling fluid comprises soluble alkali metal silicate.

55. The water-based drilling fluid of claim 54 wherein the oil phase comprises a fatty alcohol, or a mixture of a fatty alcohol with a carboxylic acid ester or a carbonic acid ester.

* * * * *